(12) United States Patent
Jansen

(10) Patent No.: US 10,456,998 B2
(45) Date of Patent: Oct. 29, 2019

(54) METHOD AND DEVICE FOR THE PRODUCTION OF A PLASTIC PROFILE

(71) Applicant: Thomas GmbH + Co. Technik + Innovation KG, Bremervörde (DE)

(72) Inventor: Klaus Jansen, Buxtehude (DE)

(73) Assignee: Thomas GmbH + Co. Technik + Innovation KG, Bremervörde (DE)

( * ) Notice: Subject to any disclaimer, the term of this patent is extended or adjusted under 35 U.S.C. 154(b) by 248 days.

(21) Appl. No.: 15/503,021

(22) PCT Filed: Jun. 30, 2015

(86) PCT No.: PCT/EP2015/001317
§ 371 (c)(1),
(2) Date: Feb. 10, 2017

(87) PCT Pub. No.: WO2016/023605
PCT Pub. Date: Feb. 18, 2016

(65) Prior Publication Data
US 2017/0232692 A1  Aug. 17, 2017

(30) Foreign Application Priority Data

Aug. 14, 2014  (DE) .................. 10 2014 011 943

(51) Int. Cl.
*B29C 70/00* (2006.01)
*B29C 70/52* (2006.01)
(Continued)

(52) U.S. Cl.
CPC ............ *B29C 70/526* (2013.01); *B29C 33/34* (2013.01); *B29C 70/523* (2013.01);
(Continued)

(58) Field of Classification Search
CPC .... B29C 70/526; B29C 70/345; B29C 70/462
See application file for complete search history.

(56) References Cited

U.S. PATENT DOCUMENTS

| 4,445,957 A | 5/1984 | Harvey | |
|---|---|---|---|
| 2002/0056508 A1* | 5/2002 | Brandstrom | B29C 70/525 156/180 |
| 2009/0206515 A1* | 8/2009 | Jansen | B29C 70/525 264/257 |

FOREIGN PATENT DOCUMENTS

| CN | 103476573 A | 12/2013 |
|---|---|---|
| DE | 102012018429 A1 | 12/2013 |

(Continued)

OTHER PUBLICATIONS

WIPO, International Search Report on priority application, dated Nov. 16, 2015.

(Continued)

*Primary Examiner* — Robert A Vetere
(74) *Attorney, Agent, or Firm* — Laurence P. Colton; Smith Tempel Blaha LLC

(57) ABSTRACT

Straight plastic profiles from a plastics material and a continuous reinforcement are predominantly produced continuously in a strand, usually by the pultrusion method. As the plastic profile is pulled through a mold, only straight plastic profiles are formed in known pultrusion methods. In the production of plastic profiles using semi-finished products or complex fibrous constructions, congestion of the fibrous constructions or of the semi-finished products, and thus solidification of the material, may arise when entering the mold, such that the process has to be stopped. A method and a device for the simple production of individually molded plastic profiles is provided in that the mold is formed from at least two mold parts that in relation to the cross section of the plastic profile are split and are moved in a temporally offset manner counter to a production direction of the plastic profile along a portion of the plastic profile.

8 Claims, 5 Drawing Sheets

(51) Int. Cl.
  *B29C 33/34*  (2006.01)
  *B29C 70/34*  (2006.01)
  *B29C 70/46*  (2006.01)
  *B29D 99/00*  (2010.01)
  *B29K 105/10* (2006.01)
  *B29K 307/04* (2006.01)

(52) U.S. Cl.
  CPC ............ *B29C 70/345* (2013.01); *B29C 70/46* (2013.01); *B29C 70/462* (2013.01); *B29D 99/0007* (2013.01); *B29K 2105/106* (2013.01); *B29K 2307/04* (2013.01)

(56) References Cited

FOREIGN PATENT DOCUMENTS

| EP | 2764982 A1 | 8/2014 | | |
|---|---|---|---|---|
| WO | 2012130396 A2 | 10/2012 | | |
| WO | WO-2012130396 A2 * | 10/2012 | ........... | B29C 70/521 |

OTHER PUBLICATIONS

State Intellectual Property Office of The People's Republic of China, Notification of the First Office Action (in a related application), dated Jul. 30, 2018.

* cited by examiner

METHOD AND DEVICE FOR THE PRODUCTION OF A PLASTIC PROFILE

STATEMENT OF RELATED APPLICATIONS

The application is the US National Phase of International Application No. PCT/EP2015/001317 having an International Filing Date of 30 Jun. 2015, now International Publication No. WO 2016/023605 A8 having an International Publication Date of 18 Feb. 2016, which claims priority on German Patent Application No. 10 2014 011 943.2 having a filing date of 14 Aug. 2014.

BACKGROUND OF THE INVENTION

Technical Field

The invention relates to a method for the production of a plastic profile having a continuous reinforcement from strands, woven fabrics, and/or the like, wherein a mold is moved counter to a production direction of the plastic profile along a portion of said plastic profile, and the plastic profile herein is retained by at least one holding means that, when viewed in the production direction, is positioned ahead of the mold, and to a device for the production of a plastic profile having a continuous reinforcement from strands, woven fabrics, and/or the like, having a mold which is movable counter to a production direction of the plastic profile along a portion of the plastic profile, and at least one holding means that, when viewed in the production direction, is positioned ahead of the mold, for at least temporarily retaining the plastic profile.

Straight plastic profiles from a plastics material and from a continuous reinforcement from fibers, woven fabrics and/or warp-/weft-knitted fabrics that are embedded in the plastics material, are predominantly produced continuously in a strand. This is usually carried out by the pultrusion method. To this end, the at least one strand is guided through a mold. In the mold the strand is provided with a liquid plastics material which subsequently cures in the mold. The cured plastic profile that exits the mold is pulled through the mold by a take-off installation that is disposed ahead of the mold in the production direction, and herein is simultaneously transported away. On account of the plastic profile being pulled through the mold by the take-off installation, only straight plastic profiles may be formed in the case of the known methods of the type described, in particular in the case of known pultrusion methods.

In the case of the production of plastic profiles using semi-finished products or complex fibrous constructions, respectively, particular problems arise when the latter are heavily compressed when entering the mold. Congestion of the fibrous constructions or of the semi-finished textile products, respectively, and thus solidification of the material, may arise when entering the mold, such that the process is stopped or has to be stopped, respectively. This risk exists in particular when the fibers run into the mold entry at an acute angle, and the materials that are used for the production of the semi-finished product typically have to be pressed flat so as to achieve a meaningful fibrous content in the plastic profile. In order for this congested situation to be alleviated, the semi-finished product may be tensioned such that congestion is practically impossible in the entry. However, this measure alone, without the material already being in the shape of the plastic profile, may lead to significant distortions of the material and to mechanical stresses in the material.

BRIEF SUMMARY OF THE INVENTION

The invention is based on the object of achieving a method and a device for the simple production of individually molded plastic profiles.

A method for achieving this object is a method for the production of a preferably curved plastic profile having a continuous reinforcement from strands, woven fabrics, and/or the like, wherein a mold is moved counter to a production direction of the plastic profile along a portion of said plastic profile, and the plastic profile herein is retained by at least one holding means that, when viewed in the production direction, is positioned ahead of the mold, characterized in that the mold is formed from at least two mold parts that in relation to the cross section of the plastic profile are split and that are moved in a temporally offset manner counter to a production direction of the plastic profile along a portion of said plastic profile. Accordingly, it is provided that the mold is formed from at least two mold parts that in relation to the cross section of the plastic profile are split and that are moved in a temporally offset manner counter to a production direction of the plastic profile along a portion of said plastic profile. Since the mold or the mold parts, respectively, is/are adapted to the two- or three-dimensional course of the plastic profile anyway, the former may follow the individual course of the plastic profile. By way of the temporally offset onward movement, counter to the production direction, of the mold parts relative to the plastic profile, a portion of the completed and cured plastic profile at least partially exits from one of the mold parts without the plastic profile having to be pulled through the mold and, on account thereof, being subjected to tensile stress that would not permit the forming of curved profiles, as is the case in the prior art. The formation of congestion of the reinforcement is precluded by the offset movement of the mold parts in that the agglomeration of the material is alternatingly pushed along in front of the moving mold part.

It is furthermore provided that the at least two mold parts are moved in a periodically alternating manner, in particular at least at times simultaneously or separately, respectively, counter to the production direction of the plastic profile along a portion of said plastic profile. Accordingly, initially a first mold part and thereafter a further, or second mold part, respectively, moves counter to the production direction along the plastic profile. However, it is also provided that the second mold part already moves on the plastic profile while the first mold part is also still moving. Two mold parts may thus move across the mold part in a manner similar to the skis of a cross-country skier.

The periodicity of the movement of the mold parts is substantially established by the type and by the shape of the mold parts and by the material or by the plastic profile to be produced, respectively. The production speed of the plastic profile may be accelerated by increasing the cycle rate.

In the case of one preferred design embodiment of the method it is provided that the at least two mold parts are moved discontinuously or in steps, respectively, preferably in a mutually parallel manner, so as to be at least partially opposite or protruding along a longitudinal axis of the plastic profile, wherein a movement of the mold parts relative to the plastic profile in particular takes place only during a reverse movement of the mold parts counter to the production direction. It is provided that the mold parts, depending on the requirements of the plastic profile to be molded, may move in an arbitrary manner, preferably in a mutually independent manner, counter to the production direction along the plastic profile.

It is provided that the plastic profile, during the movement of the at least two mold parts on the plastic profile that is stationary relative to the latter, is retained, preferably by at least one holding means. In order for the plastic profile being formed not to move during the movement of the mold parts, that portion of the plastic profile that in the production direction has already exited the mold parts is fixed or retained, respectively, by a holding means, in particular by a gripper. A reproducible production of the plastic profiles is made possible by this retention.

According to the method it is provided that initially a first mold part, preferably a convex mold part relative to the cross section of the mold, is moved counter to the production direction along the stationary plastic profile, and subsequently a second and in particular shorter mold part, preferably a concave mold part relative to the cross section of the mold, is moved in a manner likewise to that of the first mold part, wherein in the case of each movement of a mold part counter to the production direction at least part of a newly produced portion of the plastic profile is demolded or released, respectively, from the moving mold part.

In the case of the production of a curved plastic profile relative to the longitudinal axis of the mold or of the plastic profile, respectively, it is provided that the shorter mold part is moved along an external radius of the curved profile, or is moved along within an internal radius of the curved profile, respectively. It is moreover conceivable for the concave mold part to be moved first and for the convex mold part to be moved thereafter. The method according to the invention thus explicitly also provides the production of curved plastic profiles such as, for example, arches, springs, or the like, or else of closed shapes such as, for example, rings, preferably rims or bicycle rims, respectively. The method is therefore not limited to straight profiles; rather, profiles of arbitrary shapes, in particular curved profiles may be produced.

According to one further design embodiment of the method it is provided that the at least one holding means in phases during which the mold parts are stationary is brought out of contact with the plastic profile, and the at least two mold parts to move conjointly with the plastic profile in the production direction toward the at least one stationary holding means, and the at least one holding means, in order to reach an initial position, is subsequently brought back into contact with the plastic profile. Subsequent thereto, the mold parts, in order to form the profile, are moved in the opposite production direction again.

The invention preferably furthermore provides that the at least one holding means in phases during which the mold parts are stationary is brought out of contact with the plastic profile and is moved relative to the stationary plastic profile in the direction of the likewise stationary mold parts, preferably moved back counter to the production direction, is again brought into contact with the plastic profile, and subsequently the mold parts, in order to reach an initial position, are moved conjointly with the plastic profile and the holding means in the production direction.

The invention furthermore provides in particular that in the case of the mold parts moving, the reinforcement between the mold parts and a material reserve that is located behind the mold, when viewed in the production direction, is pretensioned, preferably is pretensioned by way of the convex or the concave mold part, respectively, the reinforcement being pretensioned in particular in the shape of the plastic profile to be produced. In combination with the alternating movement of the mold parts, this pretensioning leads to the fibers of the reinforcement being integrated in the plastic profile in a targeted and firm manner, but without the formation of congestion and thus without warping. On account of the reinforcement being infed to the mold entries in the form of the plastic profile to be produced, a particularly uniform and thus stable and reliable production of the method is guaranteed.

A device for achieving the object mentioned at the outset is a device for the production of a preferably curved plastic profile having a continuous reinforcement from strands, woven fabrics, and/or the like, having a mold which is movable counter to a production direction of the plastic profile along a portion of the plastic profile, and at least one holding means that, when viewed in the production direction, is positioned ahead of the mold, for at least temporarily retaining the plastic profile, characterized in that the mold is formed from at least two mold parts that in relation to the cross section of the plastic profile are split and that are movable in a temporally offset manner counter to a production direction of the plastic profile along a portion of said plastic profile. On account of the mold being formed from at least two mold parts that in relation to the cross section of the plastic profile are split and that are movable in a temporally offset manner counter to a production direction of the plastic profile along a portion of said plastic profile, almost every arbitrary individual plastic profile may be produced. The mold herein may be composed of a multiplicity of mold parts which are disposed so as to be parallel with and about the longitudinal axis of the plastic profile, conjointly forming the mold. The mold, or the mold parts, respectively, herein is/are not limited to rectilinear plastic profiles but may rather also have a radius for the production of curved or even annular plastic profiles.

The invention furthermore preferably provides that the at least two mold parts are movable in a periodically alternating manner, or in steps, respectively, in particular at least at times simultaneously and/or temporally separately, counter to a production direction of the plastic profile along a portion of said plastic profile. Depending on the shape of the plastic profile to be produced it is provided that mold parts that by virtue of the curvature need to cover longer paths on the plastic profile are moved more frequently or across longer portions than mold parts that are disposed on an internal radius of the plastic profile. The movement of the individual mold parts counter to the production direction is mutually temporally tuned. It is thus provided that the movements partially overlap in temporal terms. However, it is also provided that a next mold part moves only once a preceding mold part has completed its movement.

It is furthermore provided that the at least two mold parts are movable back and forth discontinuously or in steps, respectively, and herein are at least partially mutually opposite or protruding, respectively, along a longitudinal axis of the plastic profile. In the movement thereof along the plastic profile, the at least two mold parts are at all times located at least partially on top of one another, so as to mutually impart a hold or support, respectively. In this manner, a respective other mold part at least in regions has a face against which the former during the movement counter to the production direction may build up pressure and in this way form the plastic profile.

A further preferred exemplary embodiment moreover provides that at least one mold part is configured as a hollow section, and the at least one further mold part is configured as a core which communicates with the hollow section, and that the at least one hollow section and the at least one core are movable in a temporally offset manner counter to a production direction of the plastic profile along a portion of said plastic profile, the at least one core preferably being movable in the at least one hollow section. In this manner, tubes having a reinforcement may also be produced by the reciprocating-step method, without a congestion of fibers being formed when the reinforcement enters the mold. In the case of this exemplary embodiment of the invention it is advantageous for the mold part that is configured as the core to be longer than the mold part that is configured as the hollow section. Thus, the core always initially moves counter to the production direction, whereupon the hollow section follows the core, forming the tube.

It is provided in particular that at least one holding means is configured for the production of a releasable gripper connection to the finished plastic profile outside the mold, in particular ahead of the mold, and/or that each holding means is movable relative to the plastic profile. This holding means is configured in such a manner that it corresponds exactly to the shape of the plastic profile to be produced and may thus fully envelope the latter.

It is furthermore provided according to the invention that the mold parts have opposite mold faces, in particular compact mold faces, which communicate with one another, one mold face preferably being configured so as to be concave relative to the cross section of the plastic profile, and the opposite mold face being configured correspondingly so as to be convex, or the mold faces being configured so as to be annular, in particular one mold part, preferably the convex mold part, in relation to the longitudinal axis of the plastic profile being longer that the other mold part. It is in particular conceivable for the mold faces to be configured individually and arbitrarily. The mold faces at all times run parallel with the surface of the plastic profile to the produced.

According to one further exemplary embodiment of the present invention it is provided that the sides, or the end sides, respectively, of the mold parts that are moved first across the reinforcement, or the sides of the mold parts that face away from the production direction, respectively, on opposite mold faces have inlet ramps for receiving the reinforcement. These inlet ramps may have dissimilar angles, in particular relative to the production direction, and said inlet ramps in terms of the shape thereof depend on the shape of the plastic profile to be produced, or on the arrangement of the reserve or of the mold parts, respectively.

It is furthermore provided that a separation unit, in particular a saw for sawing the molded plastic profile, is disposed ahead of the holding means in the production direction. On account thereof the plastic profiles produced may be cut up directly into predetermined lengths and be packed for transportation, for example. On account of cutting-up taking place directly ahead of the holding means, when viewed in the production direction, the profile does not have to be reclamped in a holding means for or after cutting-up, respectively, the latter instead being performed directly in the production.

BRIEF DESCRIPTION OF THE DRAWINGS

Preferred exemplary embodiments of the invention will be explained hereunder in more detail by means of the drawing in which.

DETAILED DESCRIPTION OF PREFERRED EMBODIMENTS

The figures schematically show exemplary embodiments of the device according to the invention, which also serve for carrying out the method according to the invention.

Figure 1:
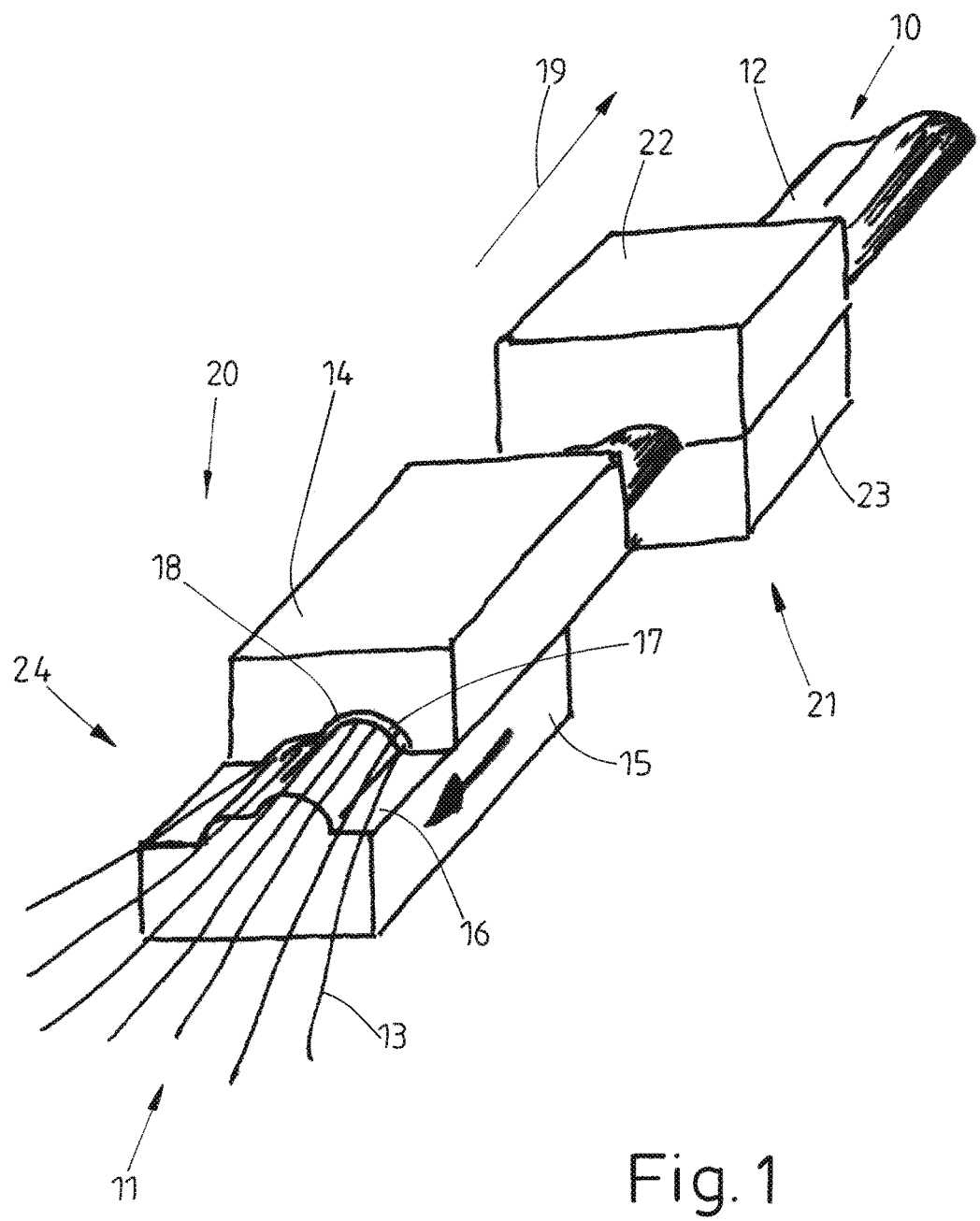
FIG. 1 shows a perspective schematic view of an exemplary embodiment of a device according to the invention.

The device is a pultrusion device for a plastic profile 10 having an internal reinforcement 11 and a plastics material 12 surrounding the latter, said plastics material 12 potentially and preferably being a curable plastics material (FIG. 1). In the exemplary embodiment of FIG. 1 that is illustrated for the purpose of visualization it is assumed that the reinforcement 11 is composed of seven endless strands 13 of preferably high-tensile fibers, for example carbon fibers. However, other arbitrary reinforcements 11, for example woven fabrics and/or warp-/weft-knitted fabrics, or a combination of the strands 13 with woven fabrics and/or warp-/weft-knitted fabrics, respectively, may also be embedded in the plastics material 12 of the plastic profile 10. Also, the invention is not limited to the seven strands 13 that are shown in the figures.

A plastic profile 10 having an arbitrary course may be produced by the schematically shown device and by the method according to the invention by way of pultrusion and with a respective mold or with respective mold parts, respectively. A straight plastic profile is shown in the figures by way of example. However, it is expressly also provided that plastic profiles 10 which possess an arcuate course, or a radius, respectively, in particular an arbitrary spatial (three-dimensional) course, to be produced by the device according to the invention and by the method according to the invention.

The device of FIG. 1 shown has a first mold part 14 and a second mold part 15, the mold faces 16 and 17 thereof corresponding to the shape or the surface shape, respectively, of the plastic profile 10 to be produced. A longitudinal central axis of the mold parts 14 and 15 is thus aligned exactly like the plastic profile 10 to be produced. The convex shape of the mold face 17 of the second mold part 15 in the course thereof corresponds to the mold face 16 of the first and concave mold part 14. The mold faces 16 and 17 are mutually tuned in such a manner that the former in the assembled state have a mutual gap or spacing 18, respectively. This spacing 18 corresponds exactly to the thickness of the plastic profile 10. In order for arbitrary profiles to be produced, the concave mold face 16 of the first mold part 14 may also deviate from the convex mold face 17 of the second mold part 15.

The first mold part 14 and the second mold part 15 are mounted in such a manner that the former are movable individually and mutually independently counter to a production direction 19 of the plastic profile 10 along the plastic profile 10, or else conjointly in the production direction 19. The device according to the invention is not limited to two mold parts; rather, it is conceivable for a multiplicity of mold parts to be provided around the plastic profile 10 for forming the latter.

A gripper 21 envelops the plastic profile 10 ahead of the mold 20, when viewed in the production direction 19. The gripper 21 has a first gripper part 22 and a second gripper part 23. The first gripper part 21 and the second gripper part 23 are movable perpendicularly to the production direction 19 up and down in such a manner that the former may release the plastic profile 10, or may retain or grip the latter. To this end, internal faces of the first and the second gripper part 22 and 23 are configured in such a manner that said internal faces may envelop the plastic profile 10 in a form-fitting manner. The gripper 21 may be configured so as to be stationary, or the former may move back and forth along the plastic profile 10 (FIG. 1).

When viewed in the production direction 19, a material reserve (not illustrated) from which the reinforcement 11 or the strands 13, respectively, are unwound is located behind the mold 20. According to the invention, the strands 13 are infed to the first mold part 14 and to the second mold part 15 in such a manner that the former already correspond to the shape of the plastic profile 10 to be produced. The strands 13 are pretensioned between the mold 20 and the material reserve, so that the former may be drawn-in in a targeted manner by the mold parts 14 and 15. In order for the strands 13 not to be imparted excessive friction forces on the edges of the first and the second mold part 14 and 15, the rearward ends 24 of the first and of the second mold part 14 and 15 each have inlet ramps 25 and 26, respectively. The strands 13 run into the mold 20 along these inlet ramps 25 and 26 (FIG. 2a, for example).

An exemplary embodiment of a method according to the invention is schematically illustrated in FIGS. 2a to 2e, using the example of a straight plastic profile 10. However, the same method in a similar manner, using a respective mold 20 and a respective gripper 21, may also be applied in order for a curved plastic profile 10 to be made.

Figure 2A:
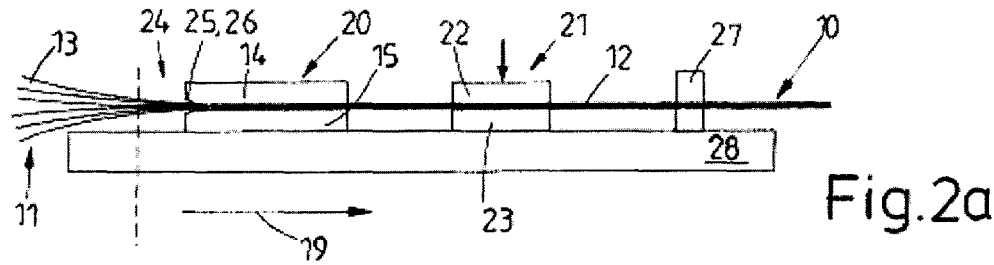
FIG. 2a shows a schematic view of an exemplary embodiment of a device according to the invention, in an initial position.

FIG. 2a illustrates an initial position. In this initial position the first and the second gripper part 22 and 23 of the gripper 21 enclose the plastic profile 10 along a circumference. The mold 20, the gripper 21, and a separation unit 27 such as a saw, for example, or a rotary cutter, are installed on a rail 28.

Figure 2B:
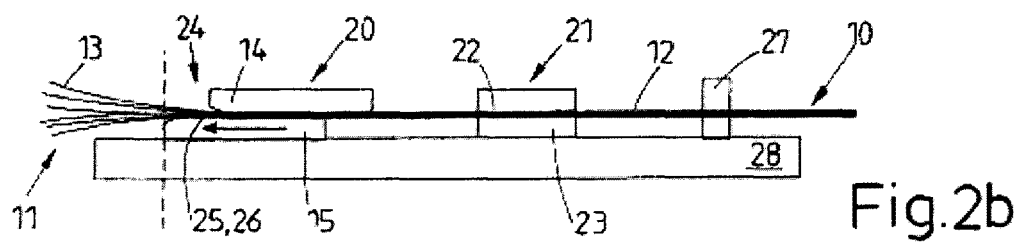
FIG. 2b shows a schematic view of the device of FIG. 2a after a first operating step.

In a first operating step according to FIG. 2b, the second mold part 15 is moved back counter to the production direction 19 on the rail 28. The first mold part 14 as well as the gripper 21 herein do not modify their position relative to the plastic profile 10. In the case of the movement of the second mold part 15, strands 13 are brought into contact with the mold face 17 of the second mold part 15 by way of the inlet ramp 26 of the second mold part 15.

Figure 2C:
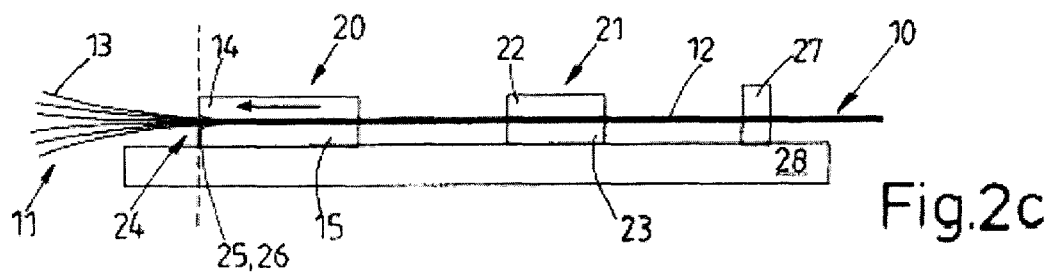
FIG. 2c shows a schematic view of the device of FIG. 2a after a second operating step.

In a third operating step according to FIG. 2c, the first mold part 14, in a manner likewise to that of the second mold part 15, is moved back counter to the production direction 19 on the plastic profile 10. The first mold part 14 herein moves across the reinforcement 11, or across the incoming strands 13, respectively. The arrows that are illustrated in FIGS. 2a to 2e identify movement directions of the individual elements. By way of the movement of the first mold part 14 across the second mold part 15, the plastic profile 10 is molded from the reinforcement 11 and from the plastics material 12 so as to correspond to the mold faces 16 and 17.

Figure 2D:
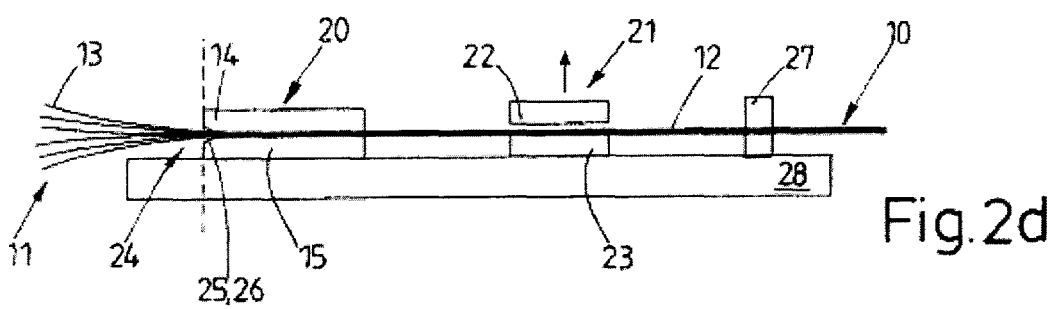
FIG. 2d shows a schematic view of the device of FIG. 2a after a third operating step.
Figure 2E:
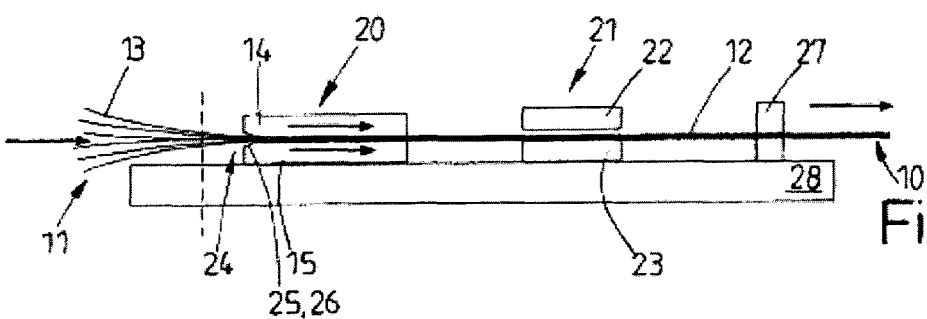
FIG. 2e shows a schematic view of the device of FIG. 2a after a fourth operating step.
Figure 3A:
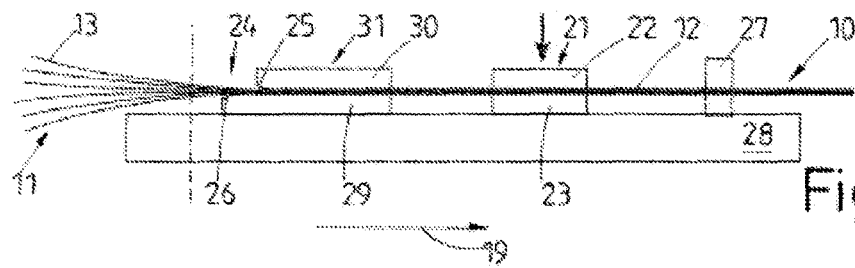
FIG. 3a shows a schematic view of a further exemplary embodiment of a device according to the invention, in an initial position.
Figure 3B:
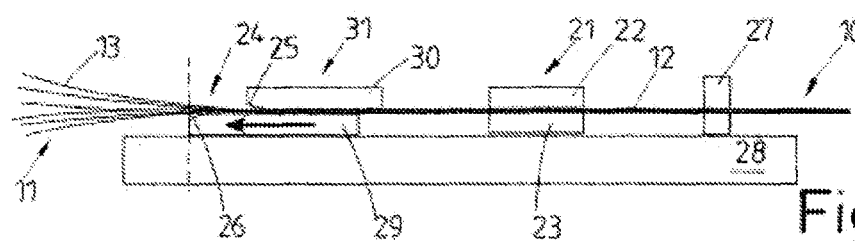
FIG. 3b shows a schematic view of the device of FIG. 3a after a first operating step.
Figure 3C:
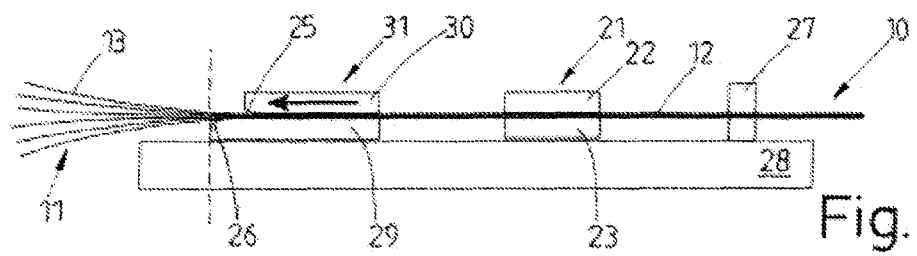
FIG. 3c shows a schematic view of the device of FIG. 3a after a second operating step.
Figure 3D:
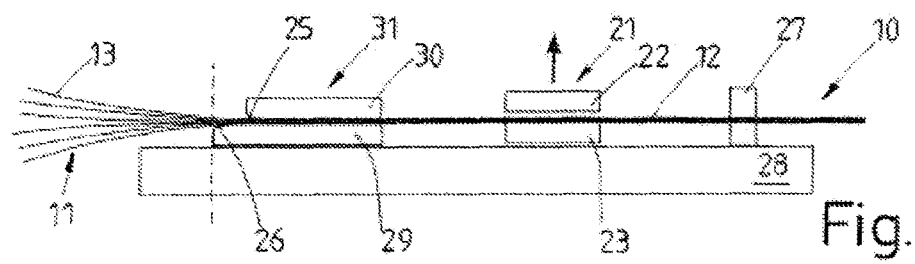
FIG. 3d shows a schematic view of the device of FIG. 3a after a third operating step.
Figure 3E:
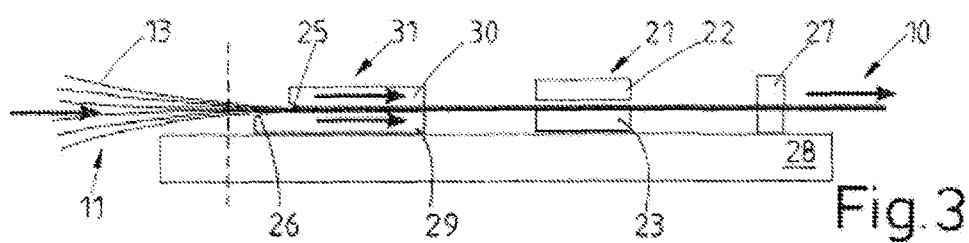
FIG. 3e shows a schematic view of the device of FIG. 3a after a fourth operating step.

In a third operating step according to FIG. 2d, the first gripper part 22 is moved perpendicularly to the production direction 19 such that the plastic profile 10 is released by the gripper 21. Subsequent to this release of the plastic profile 10 by the gripper 21, the mold 20, conjointly with the mold parts 14, 15, and the plastic profile 10, moves forward in the production direction 19. In the case of this movement, reinforcement 11 is likewise unwound from the material reserve. As soon as the mold 20 is located in an initial position again, the gripper 21 according to FIG. 2b again encompasses the plastic profile 10, and the steps of FIGS. 2a to 2e are repeated.

A further exemplary embodiment of the device according to the invention, by which the method according to the invention may be carried out, is illustrated in FIGS. 3a to 3e. The only point of difference between the exemplary embodiment illustrated in FIGS. 3a to 3e and the exemplary embodiment illustrated in FIGS. 2a to 2e lies in that a second mold part 29 is longer than a first mold part 30. Elements in FIGS. 3a to 3e that are identical to those from FIGS. 2a to 2e are identified by the same reference signs. According to FIG. 3b, the second mold part 29 is moved prior to the first mold part 30 counter to the production direction 19 for the production of the plastic profile 10. However, it is also conceivable for the first mold part to be longer than the second mold part.

A further exemplary embodiment of the method according to the invention is schematically illustrated in FIGS. 4a to 4f. The device illustrated in these figures is substantially the same as the device illustrated in FIGS. 2a and 2e. Therefore, identical elements are also identified by the same reference signs.

Figure 4A:
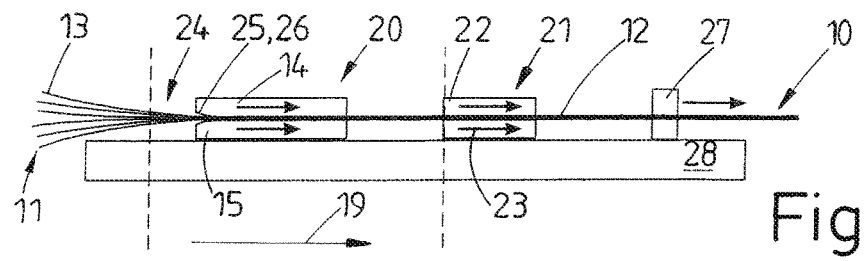
FIG. 4a shows a schematic view of a further exemplary embodiment of a device according to the invention, in an initial position.
Figure 4B:
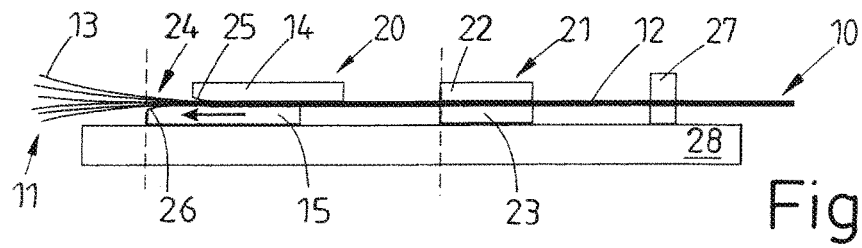
FIG. 4b shows a schematic view of the device of FIG. 4a after a first operating step.
Figure 4C:
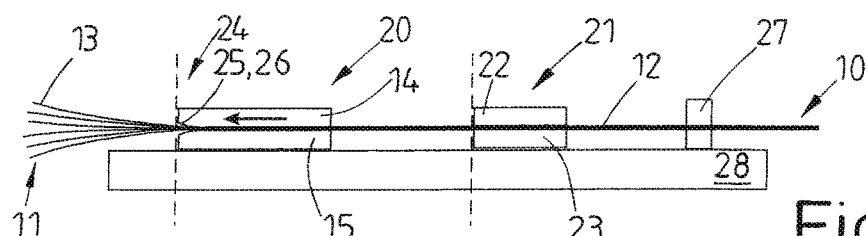
FIG. 4c shows a schematic view of the device of FIG. 4a after a second operating step.
Figure 4D:
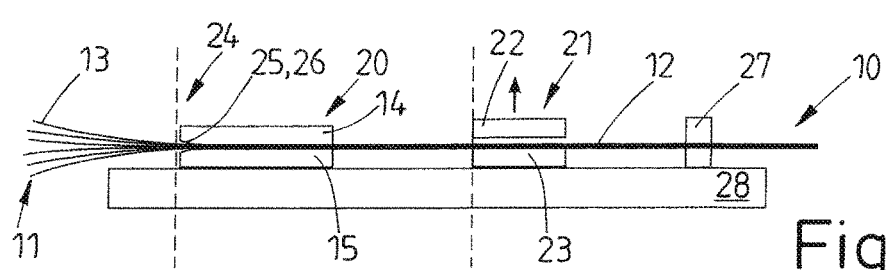
FIG. 4d shows a schematic view of the device of FIG. 4a after a third operating step.
Figure 4E:
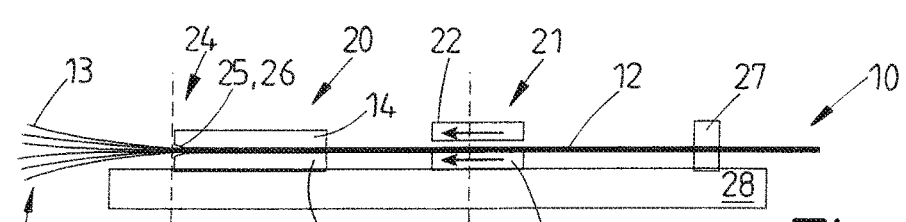
FIG. 4e shows a schematic view of the device of FIG. 4a after a fourth operating step.

An initial position of the method, in which both the gripper 21, having the two gripper parts 22 and 23 thereof, and the mold 20, having the mold parts 14 and 15, are moved forward in the production direction 19 on the rail 28, is illustrated in FIG. 4a. The plastic profile 10, conjointly with the reinforcement, is simultaneously moved in the production direction 19. The three following operating steps of FIGS. 4b to 4d are the same as the operating steps from FIGS. 2b to 2d. In the following operating step the gripper 21, the gripper parts 22 and 23 thereof being located in a position in which the former are released from the plastic profile 10, is moved counter to the production direction 19 in the direction of the mold 20 (FIG. 4e).

Figure 4F:
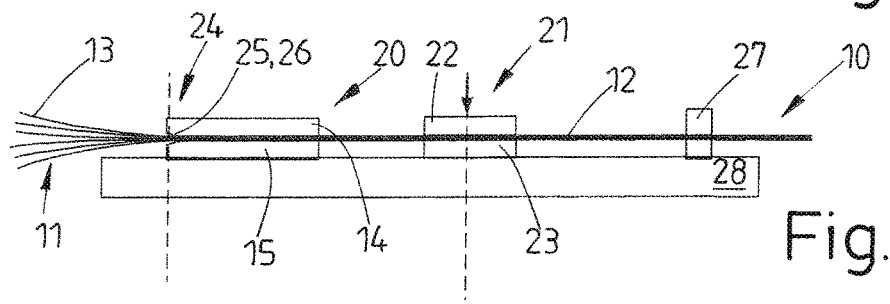
FIG. 4f shows a schematic view of the device of FIG. 4a after a fifth operating step.

In the following operating step the gripper 21 acquires the plastic profile 10 in that the first gripper part 22 is lowered perpendicularly to the production direction 19 and conjointly with the second gripper part 23 firmly encompasses the plastic profile 10 (FIG. 4f). In order to return to the initial position again, the plastic profile 10, conjointly with the reinforcement 11, is now pushed in the production direction 19, specifically with the closed mold 20 and the gripper 21. On account of the plastic profile 10 being substantially pulled by the gripper 21 in the production direction 19, the mold parts 14 and 15 do not have to be very heavily compressed. This may be advantageous when a particularly complex or sensitive plastic profile 10 is being produced by the mold 20.

Figure 5A:
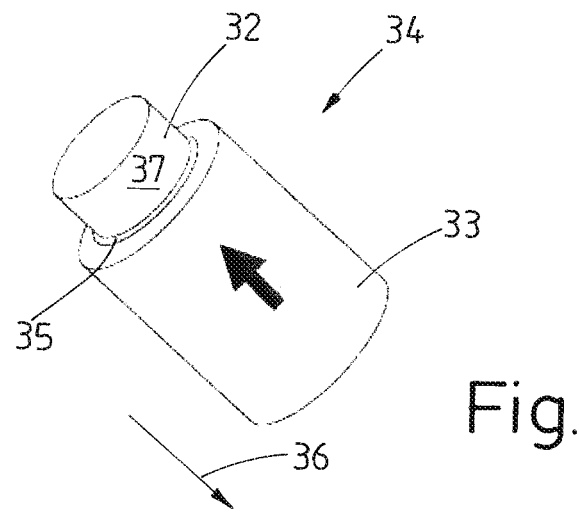
FIG. 5a shows a perspective schematic view of a further exemplary embodiment of a device according to the invention, after a first operating step.
Figure 5B:
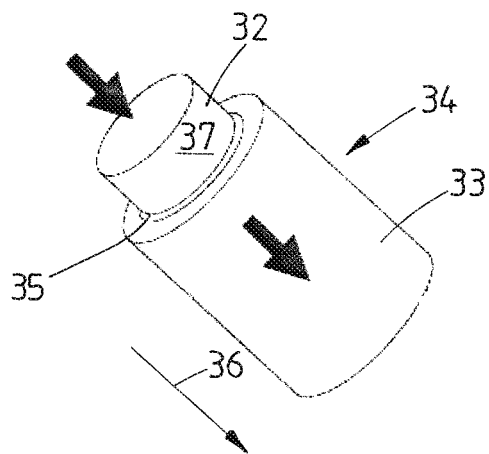
FIG. 5b shows a schematic view of the device of FIG. 5a after a second operating step.
Figure 5C:
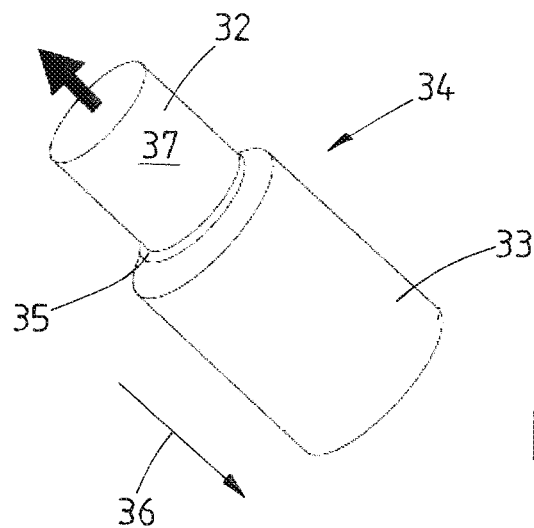
FIG. 5c shows a schematic view of the device of FIG. 5a after a third operating step.

A further exemplary embodiment of the device according to the invention, by which the method according to the invention may be carried out, is illustrated in FIGS. 5a to 5c. The first mold part 32 is configured as a cylindrical core, or as a cylinder, respectively, in FIGS. 5a to 5c. A second mold part 33 of the mold 34 is configured as a hollow cylinder that encloses the first mold part 32. A tubular plastic profile 10 (not illustrated) is molded from the reinforcement and from the plastics material between the first mold part 32 and the second mold part 33. The first mold part 32 is configured so as to be longer than the second mold part 33.

For the production of the tubular plastic profile 10 a plastics material and a reinforcement are molded in an intermediate space 35 which describes the shape of the plastic profile 10 to be produced. To this end, the second mold part 33 is initially moved in the production direction 36 across the first mold part 32 (FIG. 5a). The first mold part 32, conjointly with the second mold part 33 and the plastic profile 10, is subsequently moved forward in the production direction 36. Herein, exemplary embodiments in which a gripper 21 (not illustrated) is stationary or is conjointly moved, as in FIGS. 2a to 2e and 4a to 4f, are conceivable.

The first mold part 32 in a subsequent operating step is moved back counter to the production direction 36 by the second mold part 33 (FIG. 5c). Herein, the reinforcement 11 (not illustrated), or the strands 13, respectively, come to lie on a surface 37 of the first mold part 32. According to FIG. 5a, the second mold part 33 is then moved counter to the production direction 36 across the mold part 32 such that the plastic profile 10 to be produced is molded in the intermediate space 35. This exemplary embodiment is also not limited to rectilinear hollow sections or tubes, respectively, but by a respective configuration of the mold parts may rather also be applied in the production of curved hollow sections.

LIST OF REFERENCE SIGNS

10 Plastic profile
11 Reinforcement
12 Plastics material
13 Strand
14 First mold part
15 Second mold part
16 Mold face
17 Mold face
18 Spacing
19 Construction direction
20 Mold
21 Gripper
22 First gripper part
23 Second gripper part
24 Rearward end
25 Inlet ramp
26 Inlet ramp
27 Separation unit
28 Rail
29 Second mold part
30 First mold part
31 Mold
32 First mold part
33 Second mold part
34 Mold
35 Intermediate space
36 Production direction
37 Surface

What is claimed is:

1. A method for the production of a curved plastic profile (10) having a continuous reinforcement (11) from strands (13) or woven fabrics, wherein a mold (20, 34, 34) is moved counter to a production direction (19) of the plastic profile (10) along a portion of the plastic profile (10), and the plastic profile (10) herein is retained by at least one holding means that, when viewed in the production direction (19), is positioned ahead of the mold (20, 34, 34), comprising forming the mold (20, 34, 34) from at least two mold parts (14, 15, 29, 30, 32, 33) that in relation to the cross section of the plastic profile (10) are split and that are moved in a temporally offset manner counter to a production direction (19) of the plastic profile (10) along a portion of the plastic profile (10).

2. The method as claimed in claim 1, wherein the at least two mold parts (14, 15, 29, 30, 32, 33) are moved in a periodically alternating manner, at least at times simultaneously or separately, respectively, counter to the production direction (19) of the plastic profile (10) along a portion of the plastic profile (10).

3. The method as claimed in claim 1, wherein the at least two mold parts (14, 15, 29, 30, 32, 33) are moved discontinuously or in steps, respectively, in a mutually parallel manner, so as to be at least partially opposite or protruding along a longitudinal axis of the plastic profile (10), wherein a movement of the at least two mold parts (14, 15, 29, 30, 32, 33) relative to the plastic profile (10) takes place only during a reverse movement of the at least two mold parts (14, 15, 29, 30, 32, 33) counter to the production direction (19).

4. The method as claimed in claim 1, wherein the plastic profile (10), during the movement of the at least two mold parts (14, 15, 29, 30, 32, 33) on the plastic profile (10) that is stationary relative to the latter, is retained by at least one holding means in structured as a gripper (21).

5. The method as claimed in claim 4, wherein the at least one holding means in phases during which the at least two mold parts (14, 15, 29, 30, 32, 33) are stationary is brought out of contact with the plastic profile (10), and the at least two mold parts (14, 15, 29, 30, 32, 33) to move conjointly with the plastic profile (10) in the production direction (19) toward the at least one stationary holding means, and the at least one holding means, in order to reach an initial position, is subsequently brought back into contact with the plastic profile (10).

6. The method as claimed in claim 4, wherein the at least one holding means in phases during which the at least two mold parts (14, 15, 29, 30, 32, 33) are stationary is brought out of contact with the plastic profile (10) and is moved relative to the stationary plastic profile (10) in the direction of the at least two mold parts (14, 15, 29, 30, 32, 33) that are likewise stationary, then is moved back counter to the production direction (19), and then is again brought into contact with the plastic profile (10), and subsequently the at least two mold parts (14, 15, 29, 30, 32, 33), in order to reach an initial position, are moved conjointly with the plastic profile (10) and the holding means in the production direction.

7. The method as claimed in claim 1, wherein initially a first mold part (14, 30, 32) of the at least two mold parts (14, 15, 29, 30, 32, 33) is structured as a convex mold part (14, 30, 32) and is moved counter to the production direction (19) along the stationary plastic profile (10), and subsequently a second mold part (15, 29, 33) of the at least two mold parts (14, 15, 29, 30, 32, 33), that is shorter than the first mold part and is structured as a concave mold part (15, 29, 33), is moved in a manner likewise to that of the first mold part (14, 30, 32), wherein in the case of each movement of a one of the at least two mold parts (14, 15, 29, 30, 32, 33) counter to the production direction (19) at least part of a newly produced portion of the plastic profile (10) is demolded or released, respectively, from the moving one of the at least two mold parts (14, 15, 29, 30, 32, 33).

8. The method as claimed in claim 7, wherein in the case of the at least two mold parts (14, 15, 29, 30, 32, 33) moving, the reinforcement between the at least two mold parts (14, 15, 29, 30, 32, 33) and a material reserve is pretensioned by way of the convex mold part (14, 30, 32), the reinforcement (11) being pretensioned in the shape of the plastic profile (10) to be produced.

* * * * *